United States Patent
Brockman et al.

(10) Patent No.: US 8,901,877 B2
(45) Date of Patent: Dec. 2, 2014

(54) VEHICLE BATTERY CHARGER WITH IMPROVED CABLE STORAGE

(75) Inventors: Daryl Charles Brockman, Shorewood, WI (US); Julie Christine Roberts, Cedarburg, WI (US); Gerald Jay Demirjian, Auburn, NH (US); Timothy Corcoran Repp, Pleasant Valley, CT (US)

(73) Assignee: Johnson Controls Technology Company, Holland, MI (US)

( * ) Notice: Subject to any disclaimer, the term of this patent is extended or adjusted under 35 U.S.C. 154(b) by 359 days.

(21) Appl. No.: 13/278,451

(22) Filed: Oct. 21, 2011

(65) Prior Publication Data
US 2013/0099738 A1    Apr. 25, 2013

(51) Int. Cl.
  *H02J 7/00* (2006.01)
  *H01R 13/72* (2006.01)
  *H01M 10/46* (2006.01)
  *H01R 11/24* (2006.01)
  *F02N 11/12* (2006.01)
  *F02N 11/14* (2006.01)
  *H01R 13/717* (2006.01)

(52) U.S. Cl.
  CPC .............. *F02N 11/12* (2013.01); *H01R 13/72* (2013.01); *H01R 13/7175* (2013.01); *H02J 2007/0062* (2013.01); *H02J 7/0042* (2013.01); *H01M 10/46* (2013.01); *H01R 11/24* (2013.01); *F02N 11/14* (2013.01); *H02J 7/0047* (2013.01)
  USPC .......................................... 320/105; 439/504

(58) Field of Classification Search
  USPC .................................... 320/105; 439/504, 828
  See application file for complete search history.

(56) References Cited

U.S. PATENT DOCUMENTS

| 2,565,273 A * | 8/1951 | Shuler et al. ................... 320/105 |
| 4,902,955 A * | 2/1990 | Manis et al. ................... 320/105 |
| 4,983,473 A * | 1/1991 | Smith .............................. 429/48 |
| 5,720,628 A * | 2/1998 | Usui et al. ...................... 439/502 |
| 6,155,870 A | 12/2000 | Valentine |
| 6,565,381 B1 | 5/2003 | Chou |
| 7,252,558 B2 * | 8/2007 | Cottle ............................ 439/822 |
| 2003/0210015 A1 | 11/2003 | Levine et al. |
| 2011/0057624 A1 | 3/2011 | Rizzo |

FOREIGN PATENT DOCUMENTS

| DE | 4026020 C1 | 12/1991 |
| DE | 202007010969 U1 | 12/2008 |
| WO | 2009019028 A2 | 12/2009 |

OTHER PUBLICATIONS

U.S. Appl. No. 13/278,410, filed Oct. 21, 2011, Julie Christine Roberts et al.
U.S. Appl. No. 13/278,435, filed Oct. 21, 2011, James Cameron Douglass et al.
International Search Report and Written Opinion for PCT No. PCT/US2012/056035 dated Feb. 4, 2013; 10 pages.

\* cited by examiner

*Primary Examiner* — Edward Tso
*Assistant Examiner* — Ramy Ramadan
(74) *Attorney, Agent, or Firm* — Fletcher Yoder, P.C.

(57) ABSTRACT

A vehicle battery charger including a base unit configured to store various cables and clamps are provided. A battery charging cable and pair of battery terminal clamps coupled to the charging cable may be stored in a compartment formed in the base unit when not in use, the clamps secured to pegs mounted within the compartment and a cover closing over the compartment. A grid power cable that provides electrical power to the battery charger may be wrapped around a channel formed in the base unit and secured in the channel with a retainer when not in use.

19 Claims, 6 Drawing Sheets

US 8,901,877 B2

VEHICLE BATTERY CHARGER WITH IMPROVED CABLE STORAGE

BACKGROUND

The invention relates generally to a vehicle battery charger, and, more particularly, to a lighted clamp for use in a vehicle battery charger.

Batteries composed of one or more electrochemical cells capable of converting chemical energy into a more readily usable form of electrical energy are widely employed in many industries and applications. For example, many such batteries are starting, lighting, and ignition (SLI) batteries capable of starting the internal combustion engines of cars, trucks, motorcycles, and other vehicles. Vehicle batteries of this type can typically be discharged and replenished with charge in multiple cycles before the life cycle of the battery is depleted. In addition, deep cell batteries are capable of providing continuous electrical and/or motive power to vehicles such as golf carts. Such batteries are typically discharged slowly and almost completely before being recharged.

Battery chargers are typically used to replenish the charge stored in vehicle batteries for a number of reasons. The vehicle may be stored for a long time without use, a light left on while the vehicle is not running may drain the battery, or the battery may simply be old and in need of an additional charge. Battery chargers typically include one or more charging cables for conveying the electrical charge to terminal clamps, which are secured to the vehicle battery terminals during charging. In addition, battery chargers typically feature a grid power cable, which transfers electricity from the grid to power the battery charging process. When not in use, these multiple cables and terminal clamps may become tangled or lost in storage. In addition, damage caused to the charging cables due to improper storage may affect the quality or safety of the battery charging process. Therefore, it is now recognized that there exists a need for a battery charger with improved cable storage for when the charger is not in use.

SUMMARY

In an exemplary embodiment, a vehicle battery charger comprises a battery charging base unit, a charging power supply disposed in the base unit, and a compartment formed within the base unit. In addition, the battery charger comprises a battery charging cable assembly consisting of a charging cable coupled to the charging power supply and a pair of battery terminal clamps coupled to the charging cable. When not in use, the charging cable assembly may be received by the compartment. The terminal clamps may be received by pegs mounted in the compartment, and a covering may be secured over the compartment when the charging cable assembly is not in use. Still further, the vehicle battery charger comprises a grid power cable configured to provide electrical power to the charging power supply. A channel formed within the base unit is configured to receive the grid power cable when not in use.

In another embodiment, a vehicle battery charger comprises a battery charging base unit wherein a compartment is formed. In addition, the vehicle battery charger comprises a battery charging power supply, a charging cable coupled to the charging power supply and extending from the base unit, and a pair of battery terminal clamps coupled to a distal end of the charging cable. The battery terminal clamps are configured to be secured to terminals of a battery to be charged in order to convey electrical power from the charging power supply to the battery. When not in use, the charging cable and the terminal clamps may be stored within the compartment formed in the battery charger base unit.

In a further embodiment, a vehicle battery charger comprises a battery charging base unit from which a charging cable extends. The vehicle battery charger also comprises a charging power supply disposed in the base unit and coupled to the charging cable. Further, the vehicle battery charger comprises a pair of terminal clamps secured at a distal end of the charging cable and configured to attach to terminals of a vehicle battery. A compartment is formed in the base unit of the vehicle battery charger and is configured to receive the terminal clamps when the battery charger is not in use.

DRAWINGS

DETAILED DESCRIPTION

As described in detail below, embodiments of a vehicle battery charger with improved cable storage are provided. The vehicle battery charger features a battery charger base unit, wherein a compartment is formed. Battery terminal clamps coupled to the end of a charging cable extending from the base unit may be stored in the compartment when the battery charger is not in use. A hinged cover may be selectively disposed over the compartment both when the charging cable and terminal clamps are in use and when they are not in use. One or more apertures in either the cover or a surface of the compartment may allow for the cover to be closed over the compartment as the charging cable extends from the compartment, through the aperture. In addition, a charging power supply is disposed in the base unit and coupled to the charging cable as well as a grid power cable. This grid power cable provides electrical power to the charging power supply and may be wrapped around the base unit when the battery charger is not in use. A channel formed in the outer surface of the battery charger, between a main body of the base unit and the compartment, is configured to receive the grid power cable, and a retainer placed over the wrapped grid power cable secures it in the channel.

Figure 1:
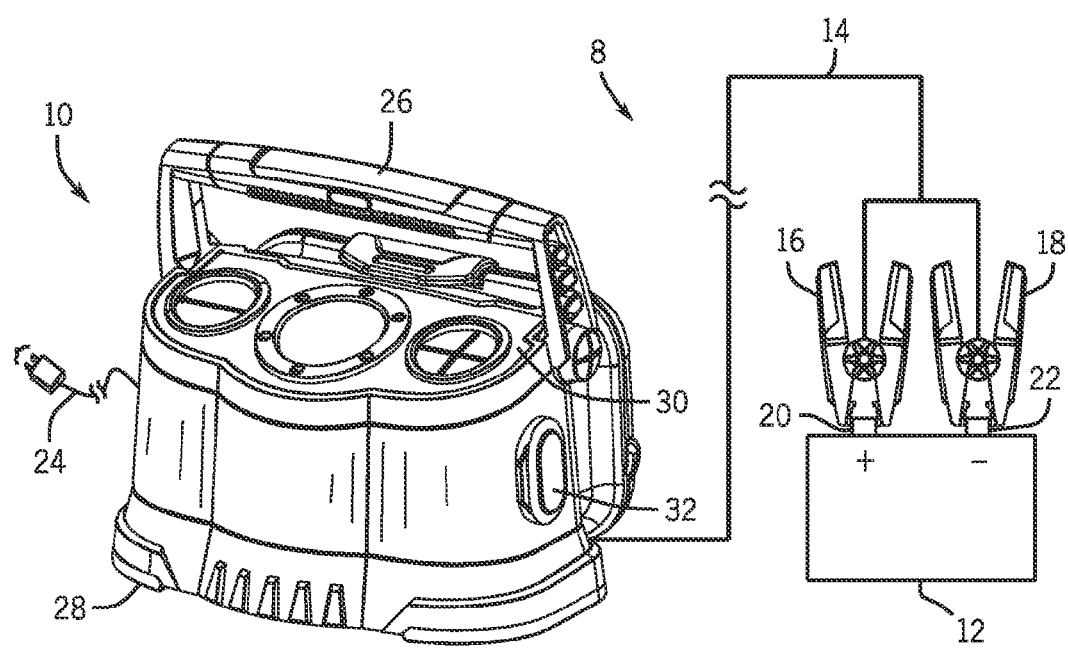
FIG. 1 is a schematic representation of an exemplary vehicle battery charger charging a vehicle battery in accordance with present techniques.

Turning now to the drawings, FIG. 1 illustrates a battery charger comprising a base unit 10, in the process of charging a battery 12. The battery 12 will typically be used in a vehicle (not shown), which may be a car, truck, motorcycle, boat, recreational vehicle, golf cart, or other vehicle that uses battery power. The battery 12 may comprise a starting, lighting and ignition (SLI) battery of any desired design, type, voltage and capacity, including a deep cycle batteries, depending on the vehicle type and the application. In addition to the base unit 10, the battery charger features a charging cable 14 that extends from the base unit 10 to a positive terminal clamp 16 and a negative terminal clamp 18. To enable charging, these clamps are configured to be secured to a positive terminal 20 and negative terminal 22 of the battery 12, respectively. Once these connections are made, electrical charging power may be applied through the cable 14 in order to build up a charge in the battery 12.

The battery charger comprises a grid power cable 24 through which AC power from the grid (or another power source) is conveyed to the internal components of the base unit 10 to power battery charging operations. This allows the battery charger to function wherever a standard AC power outlet is available or reachable by coupling an extension cord to the grid power cable 24. Both the charging cable 14 and the grid power cable 24 may be made from materials suitable for use outdoors as well as indoors. Thus, the vehicle battery charger may be used to charge the battery 12 of a vehicle that is parked outside and unable to be relocated due to its depleted battery.

The base unit 10 comprises a handle 26 that allows for portability of the base unit and grips 28 to prevent the underside of the base unit 10 from damaging or sliding off a resting surface. With the grips 28, the base unit 10 may be placed on a surface of a vehicle that houses the battery 12 to be charged or on any convenient support surface with minimal slipping. In addition, the base unit 10 comprises a dashboard 30, which functions as a user interface for the battery charger, and an auxiliary outlet 32 on the surface of the base unit 10, both of which are described in further detail below.

Figure 2:
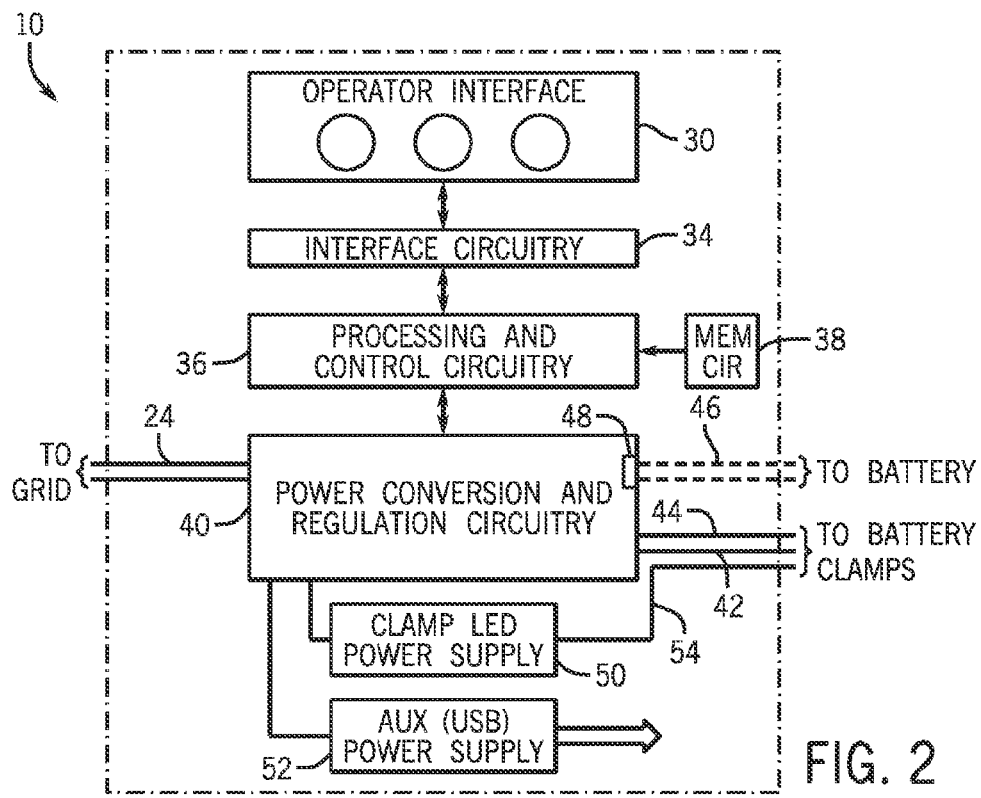
FIG. 2 is a block diagram of certain functional components of the battery charger of FIG. 1.

FIG. 2 is a block diagram featuring components in the base unit 10. The dashboard 30 acts as an operator interface, accepting various charging parameter inputs and user selections, and displaying charge information. Interface circuitry 34 connects the dashboard 30 with processing and control circuitry 36, which may also receive inputs from memory circuitry 38. The processing and control circuitry 36 runs the parameter inputs and user selections through one or more algorithms to determine an appropriate amount of charging power to be applied to the battery 12. The power conversion and regulation circuitry 40, controlled by the processing and control circuitry 36, supplies this charging power to the positive battery clamp 16 and the negative battery clamp 18 through the positive charging conductor 42 and the negative charging conductor 44, respectively. Electrical power for performing these operations is conveyed to the power conversion and regulation circuitry 40 via the grid power cable 24.

In addition, the power conversion and regulation circuitry 40 may supply power to the battery 12 through an auxiliary battery maintainer 46, which may be coupled to the base unit 10 through an auxiliary maintainer outlet 48. The battery maintainer 46 may be a device with a set of cables that, like the battery charging cable 14, features clamps that may be secured to the positive terminal 20 and the negative terminal 22 of the battery 12. The battery maintainer may be configured to deliver a charge to the battery 12 at a low rate and stop delivering the charge automatically when the battery 12 is fully charged. This type of charging, as will be appreciated by those skilled in the art, may be useful for keeping the battery 12 charged on a vehicle that is not used often (e.g., a boat, a classic car, a large car used for family trips, etc.).

The power conversion and regulation circuitry 40 connects to two other components, including a clamp light emitting diode (LED) power supply 50 and an auxiliary universal serial bus (USB) power supply 52. The clamp LED power supply 50 provides electrical power to an LED conductor 54 that travels through the charging cable 14 to an LED (or other light source) positioned on one of the terminal clamps.

Figure 3:
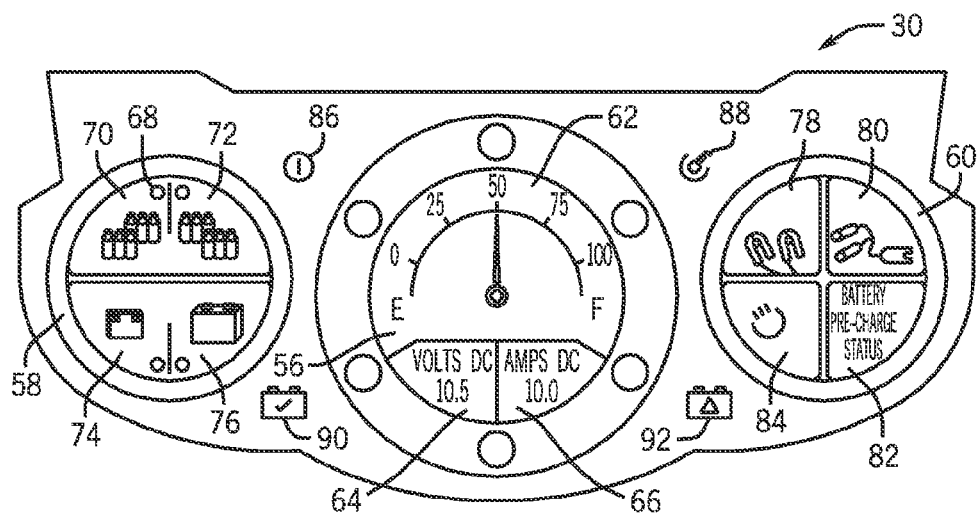
FIG. 3 is a detailed illustration of a battery charger dashboard of FIG. 1.

FIG. 3 is a detailed illustration of the dashboard 30, featuring a liquid crystal display (LCD) of charging parameters in a layout that, in the illustrated embodiment, mimics a dashboard of a high performance automobile. The circular region in the center of the dashboard 30 is a charging display 56, which shows various relevant features of the charging operation taking place through the battery charger at a given moment. The left circular region is a charging quick set selector 58 that allows for a user to select a battery type so that the battery 12 receives an appropriately configured charge. The right circular region is a maintainer quick set selector 60 that allows for a user to input parameters related to maintaining the battery 12, if applicable.

The charging display 56 comprises a gauge 62, which in this embodiment resembles a speedometer of a high performance automobile, with numbers from zero to one hundred and letter symbols from E (i.e., empty) to F (i.e., full). When the gauge needle points to zero and E, the battery 12 is considered fully discharged, or at some set minimum charge, typically determined from the battery voltage. However, as will be appreciated by those skilled in the art, vehicle batteries are typically configured to be only partially depleted while still being rechargeable. Therefore, the gauge 62 may read zero even though there is some charge remaining in the battery 12 (e.g., 11 volts), because if the charge dips below a threshold value, depending on the battery type, the battery 12 may no longer be rechargeable. Likewise, the one hundred percent charge reading on the gauge 62 may correspond to a charge (e.g., 13.8 volts) higher than one hundred percent of the charge expected for a typical twelve volt battery. In addition to the gauge 62, in the illustrated configuration, the charging display 56 comprises a voltage display 64 and a current display 66, providing digital readouts of the voltage and current being supplied to the battery 12 at a given moment.

The charging quick set selector 58 allows a user to select one of four types of vehicle batteries to charge. When a battery type is selected, an indicator light 68 may turn on in the corner of the relevant charging selection quadrant, and the corresponding input is sent to the processing circuitry to implement a charging algorithm to determine an appropriate charge to apply to the battery 12. The high performance AGM engine starting selection 70 corresponds to a high performance SLI battery used to start the internal combustion engine of a vehicle. The high performance AGM deep cycle selection 72 is also a selection for high performance batteries, although these batteries may be used to provide continuous electric and/or motive power to the vehicle and may be depleted more fully between charges. The other two selections are for standard flooded batteries, specifically, a standard motorcycle battery selection 74 for motorcycle batteries, a standard auto/marine battery selection 76 for car, truck, or boat batteries. Certain of the charging modes may be based, for example, upon the charging approaches disclosed in U.S. patent application Ser. No. 12/990,618, filed by Ronald Rizzo on May 6, 2009, entitled Battery Charging Device and Method, which is hereby incorporated into the present disclosure by reference.

The maintainer quick set selector 60 comprises four buttons which may be selected by the user to determine certain features of a vehicle battery charging process. These may be configured as charging modes, and may be adapted for different charging regimes. The battery maintainer selection 78 corresponds to a maintainer charge applied to the battery 12 through the terminal clamps. That is, the terminal clamps may be used to convey power from a charging power supply to the battery 12 at a slow trickle rate, as if the terminal clamps were battery maintainer leads. The auxiliary maintainer selection 80 may be selected when the optional battery maintainer 46 is coupled to the base unit 10 via the auxiliary maintainer outlet 48, allowing for the battery 12 to be charged slowly through a separate battery maintainer 46 that is powered by the battery charger. The battery pre-charge status selection 82 may be selected when the positive terminal clamp 16 is connected to the positive terminal 20 and the negative terminal clamp 18 is hooked up to the negative terminal 22, in order to determine the charge existing in the battery 12. This selection may be made when a user desires to know whether battery charging or battery maintaining is necessary, and when the battery pre-charge status selection 82 is chosen, the gauge 62 may display the amount of charge (e.g., voltage) available from the battery 12. The light on selection 84 restores the LCD of the dashboard 30, which powers down after the battery charger has been running for a previously determined amount of time.

The dashboard 30 comprises four additional displays that indicate the status of the battery charger and/or battery 12 throughout charging operations. The power on display 86 indicates that the base unit is receiving power from the grid power cord 24. The temperature compensation on display 88 indicates that the temperature of the battery 12 is being sensed and used to determine the most appropriate charge. The connected display 90 indicates that the positive terminal clamp 16 is connected to the positive terminal 20 and the negative terminal clamp 18 is connected to the negative terminal 22, and charging is ready to begin. The check display 92 indicates a potential error in the charging setup that may require a user's attention.

Figure 4:
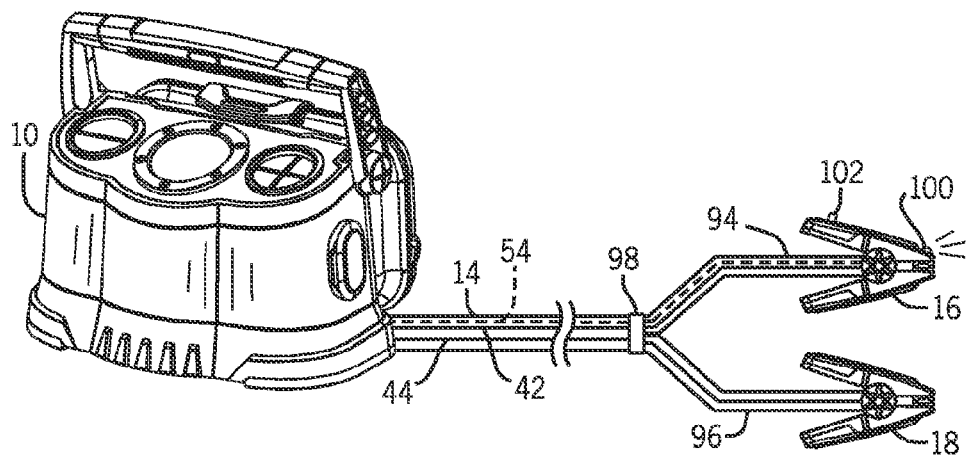
FIG. 4 is a schematic representation of the battery charger including a light emitting diode (LED) and switch for lighting an area where the charger clamps will be connected to the battery.

FIG. 4 illustrates the arrangement of wires within the charging cable 14 in accordance with present embodiments. For the wires to convey electrical charging power to the separate terminal clamps, the charging cable 14 separates into a positive cable 94 leading to the positive terminal clamp 16 and a negative cable 96 leading to the negative terminal clamp 18. The charging cable 14 separates at a cable juncture 98 that, in present embodiments, is located approximately eighteen inches from both where the positive cable 94 meets the positive terminal clamp 16 and where the negative cable 96 reaches the negative terminal clamp 18. In the illustrated embodiment, the positive cable 94 contains the positive charging wire 44 and the LED wire 54, which carries electrical power to an LED 100 located on the positive terminal clamp 16. Although the LED wire 54 is represented in FIG. 4 as a single dashed line, the wire comprises two conductors that are enclosed in the positive cable 94 and coupled to the LED 100 to form a circuit that connects the clamp LED power supply 50 to the LED 100 and a switch 102 that is also located on the positive terminal clamp 16. The circuit through the positive cable 94 and positive terminal clamp 16 may be completed by depressing the momentary contact switch 102, allowing the LED 100 to be selectively powered by a user to illuminate the positive terminal 20 of the battery 12.

It should be noted that in other embodiments, different light sources and switches may be employed to illuminate the battery terminals. In addition, other arrangements of the switch, light source, and conductors conveying power through the circuit may be envisioned by those skilled in the art. For example, a toggle switch may be positioned at a different location on the positive terminal clamp 16 so that a user would not need to hold down a button on the positive terminal clamp 16 for an extended period of time while connecting the positive terminal clamp 16 to the positive terminal 20. In addition, an LED arrangement, complete with the LED 100, the LED wire 54, and the switch 102 may be applied to both sets of clamps and cables, instead of only the positive terminal clamp 16 and positive cable 94. This would allow for both clamps to illuminate the corresponding battery terminals in an otherwise dark environment.

Figure 5:
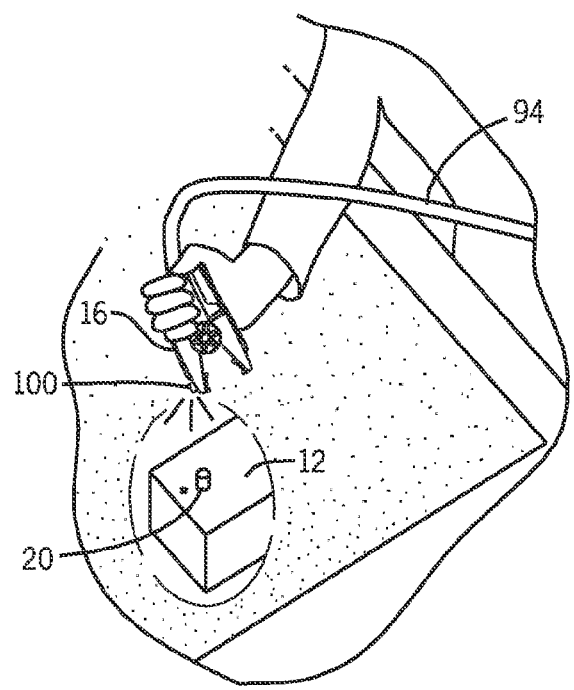
FIG. 5 is a perspective view of the lighting arrangement of FIG. 4 illuminating a vehicle battery.

FIG. 5 shows the LED 100 on the positive terminal clamp 16 in action. A user grasping the positive terminal clamp 16 depresses the switch 102 (covered by the user's hand) to activate the LED 100, illuminating a "+" marking (or other indicia) on the positive terminal 20 of the battery 12 in an otherwise dark region under the hood of a car. Applying the LED 100 to the positive terminal clamp 16 may be advantageous because the positive terminal clamp 16 is typically secured to the positive terminal 20 before the negative terminal clamp 18 is secured to the negative terminal 22 in order to make the connections necessary for charging a vehicle battery 10. In addition, disposing the LED 100 on the positive terminal clamp 16 adds a distinction to the positive terminal clamp 16, making it less likely to be mistaken for the negative terminal clamp 18.

Figure 6:
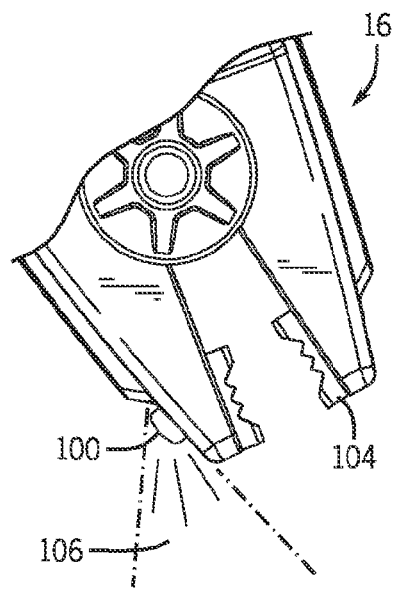
FIG. 6 is a detailed view of the battery charger clamp of FIG. 5.

A close up view of the positive terminal clamp 16 with the LED 100 illuminated is illustrated in FIG. 6. The LED 100 shines light from an outside edge of the clamp so that the illumination may not be obscured by the teeth 104 used to clamp directly onto the positive terminal 20. Positioning the LED 100 near the tip of the clamp allows a light path 106 to reach farther in the direction of the clamp tip than if it were positioned closer to the gripped region of the clamp.

Figure 7:
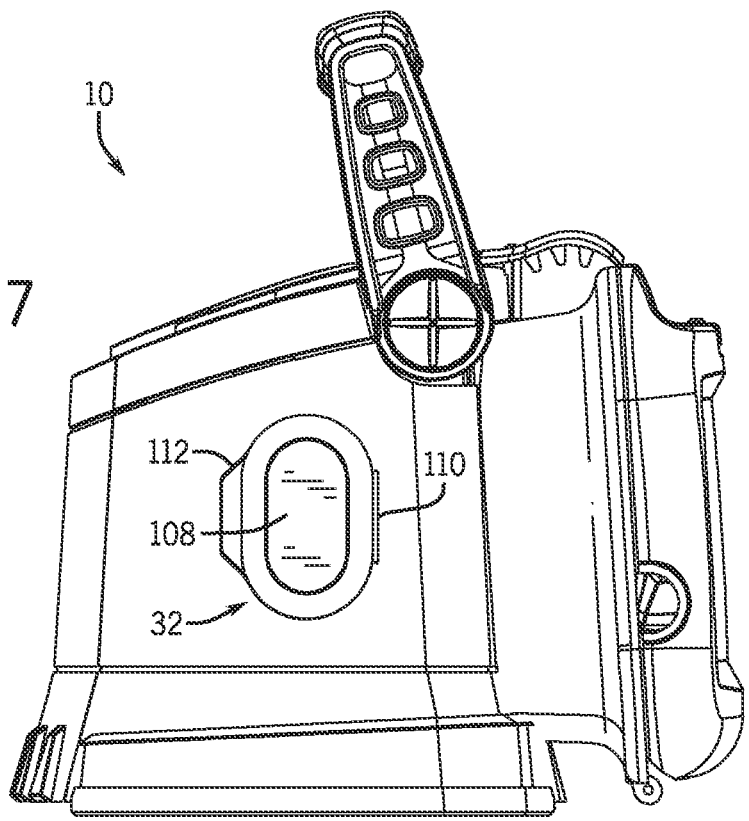
FIG. 7 is a right side view of the base unit of FIG. 1.
Figure 8:
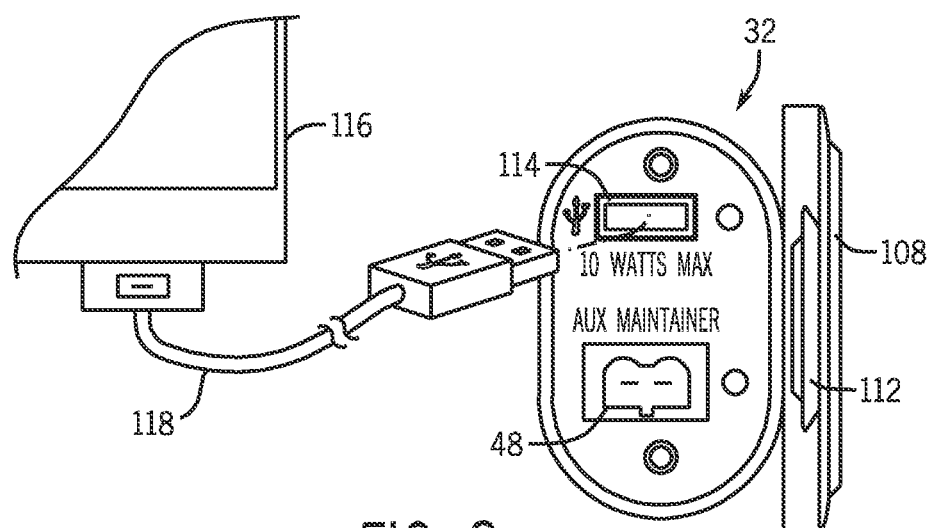
FIG. 8 is an illustration of the auxiliary outlet of FIG. 7 and an external device that may be powered by connection to the outlet.

FIG. 7 is a right side view of the base unit 10, not showing the coupled charging cable 14 or grid power cable 24. This view illustrates the auxiliary outlet 32 on the surface of the base unit 10, the auxiliary outlet 32 including an outlet cover 108 that may be closed when the auxiliary outlet 32 is not in use. A hinge 110 attaches the outlet cover 108 to the base unit 10, and a closure 112 may be used to secure the outlet cover 108 closed over the auxiliary outlet 32. FIG. 8 shows the auxiliary outlet 32 when the outlet cover 108 is in the open position, revealing two outlets for external devices. A USB port 114 allows for an external device 116 to be powered and/or charged by the battery charger if the external device 116 includes a USB compatible charging device 118. When inserted into the USB port 114, which is coupled to the auxiliary USB power supply 52 of FIG. 2, the USB charging device 118 conveys power from the USB port 114 to the external device 116. This allows a user to charge the vehicle battery 12 while simultaneously powering and/or charging a mobile telephone, hand-held computer, or any other external device. In a presently contemplated embodiment, the USB port 114 may convey electrical power rated up to approximately ten watts to the external device 116 (the power required to charge certain cellular, wireless or hand-held devices) through the USB charging device 118. In this embodiment, the USB port 114 is not configured to convey information either to or from the external device 116, although such capabilities may be included if appropriate circuitry is include in the charger.

Figure 9:
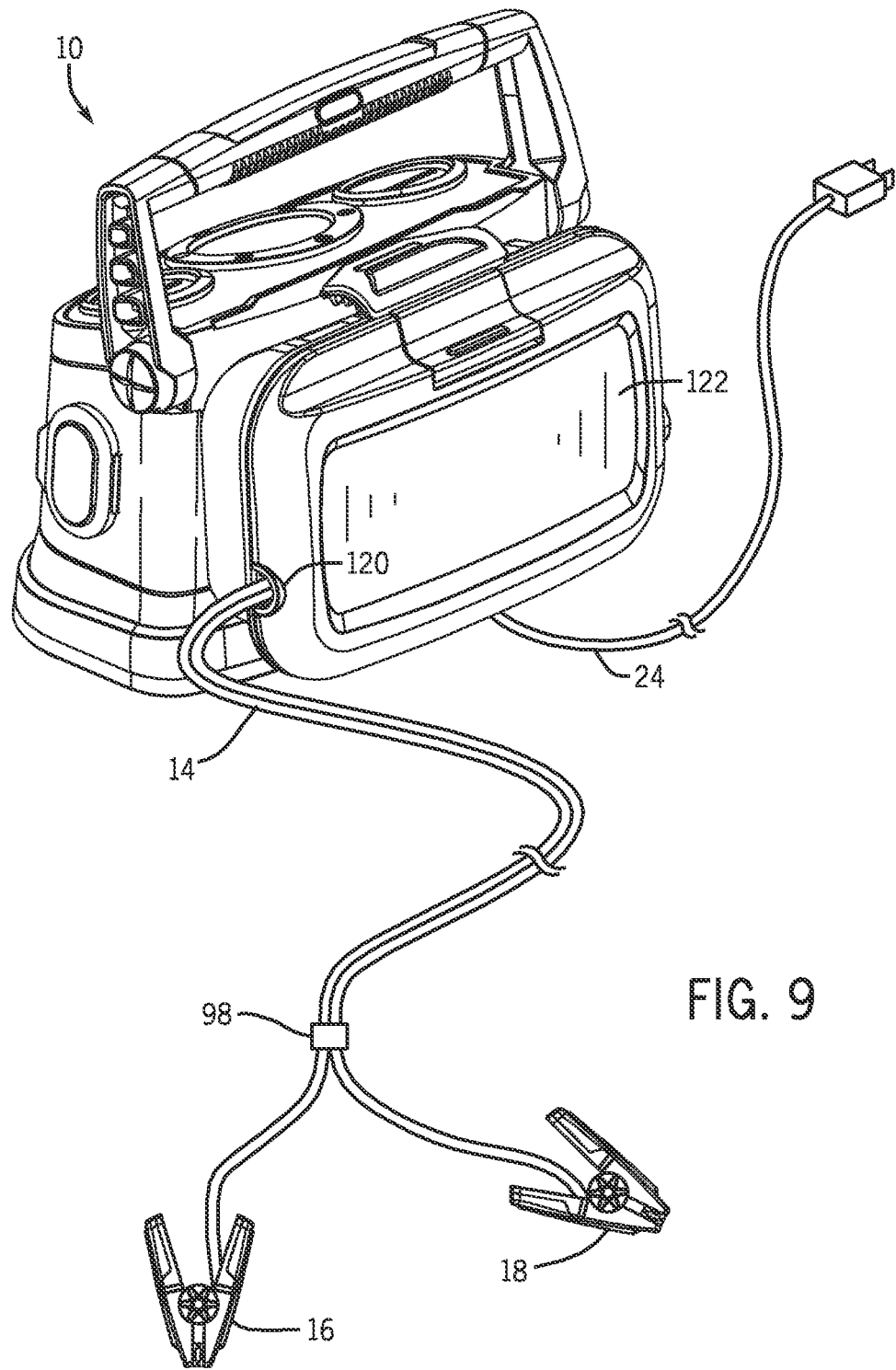
FIG. 9 is a perspective view of the battery charger with cables extending from the base unit.

FIG. 9 illustrates the battery charger base unit 10, with fully extended charging cable 14 and grid power cable 24. This arrangement shows the charging cable 14 extending away from the base unit 10 through a semicircular aperture 120 in the side of a back cover 122. An identical aperture 120 may be featured on the opposite side of the back cover (not shown) so that the charging cable 14 may extend from the base unit 10 in a convenient direction for reaching the battery 12. Other embodiments may feature the aperture 120 through an outer surface of the base unit 10 adjacent to the back cover 122. The grid power cable 24 extends from the underside of the back end of the base unit 10. In this embodiment, both the charging cable 14 and the grid power cable 24 are permanently attached to the base unit 10 in order to convey electrical power necessary for battery charging operations, although one or both of these cables may adapted for plug-in operation and separated from the charger base when desired.

Figure 10:
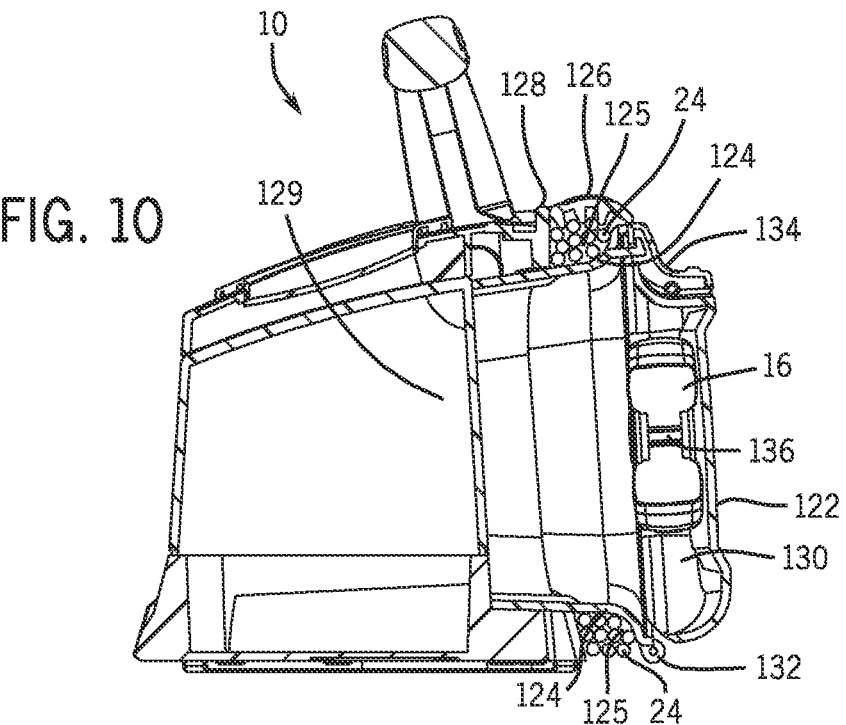
FIG. 10 is a right side section view of the battery charger with the grid power cable wrapped around the base unit for storage.

When the battery charger is not in use, the grid power cable 24 and battery terminal clamps may be stored with the base unit 10, as shown in the section view of FIG. 10. For storing the grid power cable 24, the base unit features an edge 124 that defines a channel 125 around the base unit 10. The grid power cable 24 may be wrapped around the edge 124 multiple times until its end is reached, at which point the grid power cable 24 is layered upon itself in the channel 125. With the grid power cable 24 wrapped around the edge 124, a retainer 126 may then be secured over the grid power cable 24 and held in place by a detent 128. In this way, the grid power cable 24 is secured within the channel 125 formed between a main body 129 of the base unit 10 and a compartment 130 in the base unit 10. FIG. 10 shows the positive terminal clamp 16 stored inside the compartment 130 and enclosed by the back cover 122, which is attached to the base unit with a back cover hinge 132 and closed with a back cover closure 134. Stored in the compartment 130, the positive terminal clamp 16 rests on a peg mount 136 comprising a cylinder disposed within the compartment 130.

Figure 11:
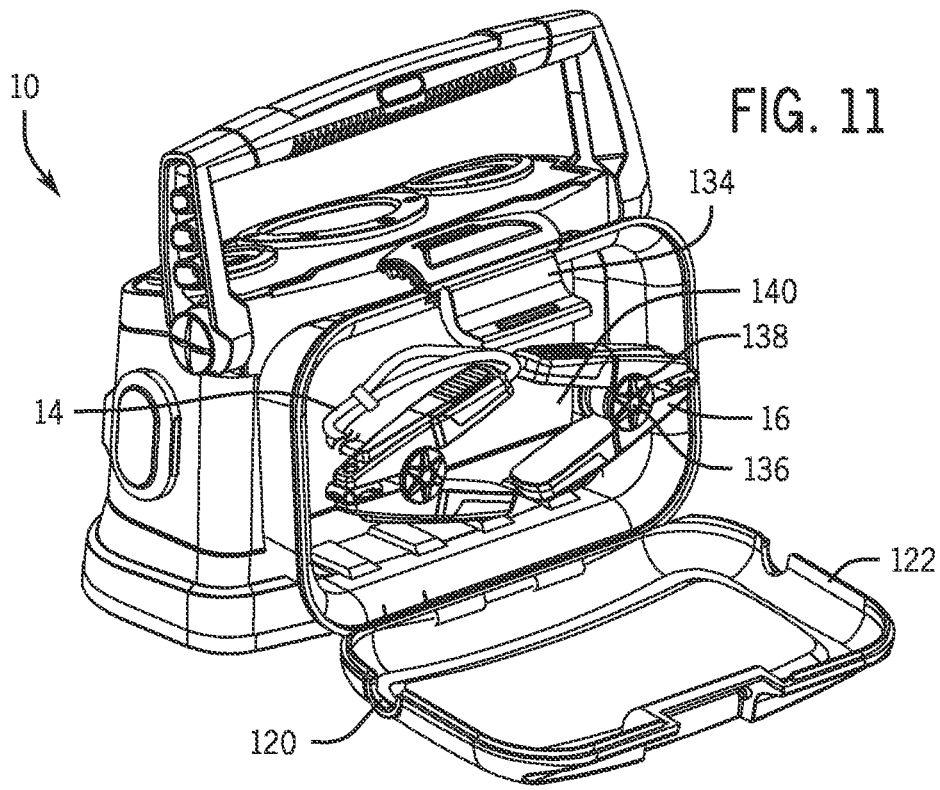
FIG. 11 is a perspective view of the battery charger with an open back cover revealing stored terminal clamps.

FIG. 11 illustrates the management of the charging cable 14 and clamps when the battery charger is not in use. The positive terminal clamp 16 features a pivot assembly 138 with a circular aperture that may be positioned onto the peg mount 136. In addition, the pivot assembly 138 of the positive terminal clamp 16 may snap onto the peg mount 136 to prevent the positive terminal clamp 16 from moving around in the compartment 130. It should be noted that the technique for mounting only one of the battery charging clamps, the positive terminal clamp 16, has been presented in this paragraph, and there exists a second peg mount 136 upon which the negative terminal clamp 18 may be mounted in the same way. Along with both clamps, the charging cable 14 is stored in the compartment 130, where the charging cable 14 couples with the main body 129 of the base unit 10 at an inner wall 140 of the compartment 130. This inner wall 140 also forms the surface from which the peg mounts 136 extend. Managing the cables and clamps through the techniques described herein allows for users to easily store and transport all components of the vehicle battery charger.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A vehicle battery charger, comprising:
a battery charging base unit having a main body;
a battery charging power supply disposed in the battery charging base unit, wherein the battery charging power supply comprises power conversion and regulation circuitry;
a grid power cable coupled to the power conversion and regulation circuitry and extending from the battery charging base unit, wherein the grid power cable is configured to transmit AC power from a power grid to the power conversion and regulation circuitry;
a battery charging cable assembly coupled to the power conversion and regulation circuitry and extending from the battery charging base unit, the battery charging cable assembly comprising a cable and a pair of battery terminal clamps secured to the cable and configured to be secured to terminals of a battery to be charged via the power conversion and regulation circuitry;
a compartment comprising a first compartment side, a second compartment side, and a peripheral channel extending between the first and second compartment sides, wherein the first compartment side is disposed on the main body of the battery charging base unit, wherein the peripheral channel extends away from the main body from the first compartment side to the second compartment side, wherein the compartment is configured to receive the battery charging cable assembly, and wherein the peripheral channel is configured to receive the grid power cable.

2. The vehicle battery charger of claim 1, comprising a pair of peg mounts in the compartment, the peg mounts being configured to receive the clamps when not in use.

3. The vehicle battery charger of claim 2, wherein each of the clamps comprises a pivot assembly having an aperture formed therethrough, and wherein each of the peg mounts is configured to be received in the pivot assembly aperture of a respective clamp.

4. The vehicle battery charger of claim 1, comprising a cover configured to substantially close the compartment when the charging cable and the clamps are not in use.

5. The vehicle battery charger of claim 4, wherein the cover is also configured to substantially cover the compartment when the charging cable and clamps are in use.

6. The vehicle battery charger of claim 5, wherein the battery charging base unit or the cover comprises at least one aperture configured to permit passage of the charging cable therethrough when in use with the cover over the compartment.

7. The vehicle battery charger of claim 4, wherein the cover is hinged to the compartment on a bottom portion of the compartment extending between the first compartment side and the second compartment side, wherein the cover is configured to be able to rotate downwardly about the hinge toward an open position.

8. The vehicle battery charger of claim 1, wherein the peripheral channel is configured to permit wrapping of the grid power cable around the compartment when not in use.

9. The vehicle battery charger of claim 1, comprising a retainer coupled to the peripheral channel of the compartment proximate the second compartment side and adjacent to the peripheral channel, wherein the retainer is configured to secure the grid power cable within in the peripheral channel.

10. A vehicle battery charger, comprising:
a battery charging base unit;
a handle attached to the battery charging base unit at a base of the handle;
a battery charging power supply disposed in the battery charging base unit, wherein the battery charging power supply comprises power conversion and regulation circuitry;
a charging cable coupled to the power conversion and regulation circuitry and extending from the battery charging base unit;
a grid power cable coupled to the power conversion and regulation circuitry and extending from the battery charging base unit, wherein the grid power cable is configured to transmit AC power from a power grid to the power conversion and regulation circuitry;
a pair of battery terminal clamps secured to the charging cable and configured to be secured to terminals of a battery to be charged via the power conversion and regulation circuitry;
a compartment formed in the battery charging base unit and configured to receive the charging cable and the clamps;
a cover coupled to the compartment via a hinged connection, wherein the cover is configured to rotate between a closed position and an open position about the hinged connection; and
a channel configured to receive the grid power cable, wherein the channel is disposed between the cover and the base of the handle and is configured to enable wrapping of the grid power cable around the compartment.

11. The vehicle battery charger of claim 10, wherein the cover is configured to be able to substantially cover the compartment when the charging cable and clamps are in use.

12. The vehicle battery charger of claim 11, wherein the battery charging base unit or the cover, or both, comprises at least one aperture configured to permit passage of the charging cable therethrough with the cover over the compartment in the closed position.

13. A vehicle battery charger, comprising:
a battery charging base unit with a main body having a top end, a bottom end substantially opposite the top end, a front end extending between the top and bottom ends, and a back end substantially opposite the front end;
a battery charging power supply disposed in the battery charging base unit, wherein the battery charging power supply comprises power conversion and regulation circuitry;
a charging cable coupled to the power conversion and regulation circuitry and extending from the battery charging base unit;
a grid power cable coupled to the power conversion and regulation circuitry and extending from the battery charging base unit, wherein the grid power cable is configured to transmit AC power from a power grid to the power conversion and regulation circuitry;
a pair of battery terminal clamps secured to the charging cable and configured to be secured to terminals of a battery to be charged via the power conversion and regulation circuitry;
a compartment formed in the back end and extending away from the main body of the battery charging base unit and configured to receive the clamps, wherein the compartment comprises a peripheral channel that extends from the back end to a mating surface of the compartment, wherein the peripheral channel is configured to receive the grid power cable; and
a cover configured to couple to the mating surface to substantially close the compartment when the cover is in a closed position, wherein the cover is substantially parallel to the back end of the main body of the battery charging base unit when the cover is in the closed position.

14. The vehicle battery charger of claim 13, comprising a pair of peg mounts in the compartment, the peg mounts being configured to receive the clamps when not in use.

15. The vehicle battery charger of claim 14, wherein each of the clamps comprises a pivot assembly having an aperture formed therethrough, and wherein each of the peg mounts is configured to be received in the pivot assembly aperture of a respective clamp.

16. The vehicle battery charger of claim 10, comprising a retainer disposed adjacent to the channel and configured to be secured over the grid power cable to hold the grid power cable in the channel, wherein the retainer is configured to couple to a detent disposed on the main body of the battery charging base unit such that the retainer extends across the channel to hold the grid power cable in the channel.

17. The vehicle battery charger of claim 13, comprising a hinge between the cover and the compartment, wherein the hinge is disposed adjacent a bottom side of the compartment opposite a top side of the compartment comprising the mating surface, wherein the hinge is configured to enable the cover to rotate downwardly about the hinge from the closed position to an open position.

18. The vehicle battery charger of claim 13, comprising a retainer disposed adjacent to the peripheral channel and configured to be secured over the grid power cable to hold the grid power cable in the peripheral channel, wherein the retainer is disposed on the sloped periphery of the compartment and is configured to be coupled to a detent disposed on the top end of the main body of the battery charging base unit to hold the grid power cable in the peripheral channel.

19. The vehicle battery charger of claim 13, comprising:
a handle disposed on the top end of the main body of the battery charging base unit; and
a control board disposed on the top end of the main body of the battery charging base unit, wherein the control board is disposed between attachment points of the handle of the battery charging base unit.

* * * * *